E. H. Angamar.
Pile Driver.
No. 9,265. Reissued Mar. 6, 1860.
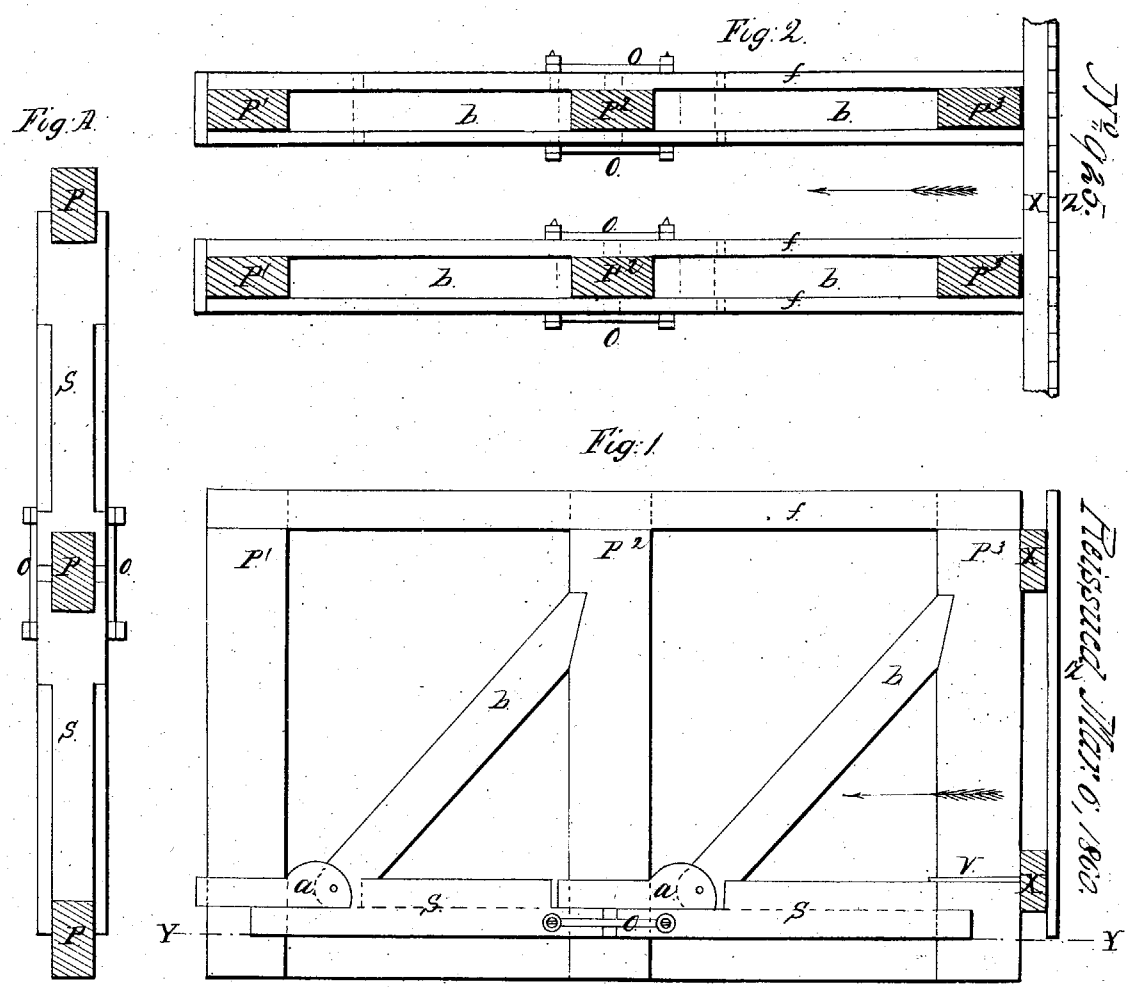
Witnesses:
Seamen Armstrong
Wm. H. Holland
Inventor,
E. H. Angamar
N. PETERS, PHOTO-LITHOGRAPHER, WASHINGTON, D. C.

UNITED STATES PATENT OFFICE.

E. H. ANGAMAR, OF NEW ORLEANS, LOUISIANA.

IMPROVEMENT IN MODE OF STAYING PILES FOR WHARVES, PIERS, &C.

Specification forming part of Letters Patent No. 24,708, dated July 12, 1859; Reissue No. 925, dated March 6, 1860.

*To all whom it may concern:*

Be it known that I, E. H. ANGAMAR, of the city of New Orleans, parish of Orleans, and State of Louisiana, have made a new and useful Improvement in the Mode of Supporting Piles to be Used in Stopping Crevasses, Erecting Break-Waters, &c.; and I do hereby declare the following to be a correct description of the same, reference being had to the accompanying drawings, in which—

Figure 1 is a side elevation of a series of piles braced in my improved mode. Fig. 2 is a plan or top view of the same. Fig. A is a separate plan of the frame S, and Fig. B is a separate plan of the sleeve.

The same part is marked by the same letter of reference wherever it occurs.

The principal application of my improvement which I contemplate is to the stopping of crevasses and a description of the mode of proceeding for this purpose will sufficiently explain the character and use of the invention, which consists in a mode of bracing and staying piles both at top and bottom when such piles are driven in an uneven and easily-abraded surface, and are exposed to rapid currents of water.

The direction in which the current approaches the piles is indicated in the drawings by the arrows, and the bracing is to be applied in the opposite direction. The soil in which the piles are driven being of an uneven surface, arrangements must be made to secure the support of the piles by braces resting on such a surface.

I first drive any required number of piles, $P'$ $P^2$ $P^3$, either simultaneously or in succession. The frame S S is then passed over the piles, the elements of the frame being joined by the links O, as clearly shown in Fig. A. The frame A is loaded so as to cause it to sink and settle on the surface of the soil in which the piles are driven, that surface being indicated in Fig. 1 by the line *y y*. When the frame has settled to its position, the sleeves *a*, seen in Figs. 1 and A, having the braces *b* hinged to them, are passed over the heads of the piles and sink till they rest on the frames S S, which support them. The braces are then framed into the upper portion of the piles, as shown. To the front of piles $P^3$, I attach at top and bottom transverse timbers X, the submerged ones being held by means of stirrups or clamps V, passing around the piles. The upper timbers, X, serve as cross-ties to the piles and as a support to the upright planking Z. The timbers *f* serve as binders for the top of the piles, securing them together in a direction at right angles to the timbers X.

The links in the frame S are for the purpose of allowing the timbers of the frame to accommodate themselves to the inequalities in the surface of the ground upon which they rest. This frame may in some cases be dispensed with, as, for instance, where the subsoil is hard. In such a case the sleeve *a* will be all that is required. Sometimes even simple jaws might be sufficient, but in sandy and abrasive soils the frame will be found an invaluable adjunct to the sleeve.

When the brace is framed as described and a heavy pressure brought to bear against it, the sleeve binds so tightly against the piles that even if the soil under the sleeve were washed away it would not slide down any lower, but remain as firmly in place as if it had been spiked or bolted there. Thus braced the piles cannot be washed away or bent down by the current or carried away by drift logs, but will stand almost any amount of strain or pressure.

Having thus fully described my invention, what I claim, and desire to secure by Letters Patent, is—

1. The linked frame S S, constructed and operating as described, for the purpose specified.

2. In combination with piles as described, the sleeves *a* and braces *b*, constructed and operating substantially as specified.

E. H. ANGAMAR.

Witnesses:

A. O. DETEZIN,

E. TYROUX.